United States Patent
Kelley et al.

(10) Patent No.: US 7,904,522 B2
(45) Date of Patent: Mar. 8, 2011

(54) METHOD, SYSTEM, AND STORAGE MEDIUM FOR PROVIDING SEARCH AND REFERENCE FUNCTIONS FOR A MESSAGING SYSTEM

(75) Inventors: Edward E. Kelley, Wappinger Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/130,477

(22) Filed: May 30, 2008

(65) Prior Publication Data

US 2009/0077548 A1 Mar. 19, 2009

Related U.S. Application Data

(63) Continuation of application No. 10/605,573, filed on Oct. 9, 2003, now Pat. No. 7,383,305.

(51) Int. Cl.
*G06F 15/16* (2006.01)
(52) U.S. Cl. .................. 709/206; 707/3; 707/10
(58) Field of Classification Search .................. 709/204
See application file for complete search history.

(56) References Cited

U.S. PATENT DOCUMENTS

| | | | |
|---|---|---|---|
| 5,987,503 A * | 11/1999 | Murakami | 709/204 |
| 6,643,694 B1 | 11/2003 | Chernin | |
| 6,930,598 B2 | 8/2005 | Weiss | |
| 6,963,904 B2 | 11/2005 | Yong | |
| 6,970,908 B1 | 11/2005 | Larky et al. | |
| 7,035,903 B1 | 4/2006 | Baldonado | |
| 2002/0184317 A1 | 12/2002 | Thankachan | |
| 2003/0110211 A1 | 6/2003 | Danon | |
| 2003/0126136 A1 | 7/2003 | Omoigui | |
| 2004/0128540 A1 | 7/2004 | Roskind | |
| 2004/0158610 A1 | 8/2004 | Davis et al. | |
| 2004/0210450 A1 | 10/2004 | Atencio et al. | |

* cited by examiner

*Primary Examiner* — Dustin Nguyen
(74) *Attorney, Agent, or Firm* — Cantor Colburn LLP; Ronald Kaschak

(57) ABSTRACT

An exemplary embodiment of the invention relates to a method, system, and storage medium for providing search and reference functions for a messaging system. The method comprises receiving a request to search a data archive for reference information relating to at least one keyword selected by a messaging system user while the messaging system user is actively engaged in composing a message or a response to a message. The keyword is selected from the body of text contained in the message. The method further includes searching the data archive and, if a reference is found, presenting the reference to the messaging system user within the message. The data archive includes information gathered from the messaging system user's message folder and at least one of a local data storage system, and a shared online repository. Embodiments of the invention also include a system and a storage medium.

26 Claims, 14 Drawing Sheets

METHOD, SYSTEM, AND STORAGE MEDIUM FOR PROVIDING SEARCH AND REFERENCE FUNCTIONS FOR A MESSAGING SYSTEM

CROSS-REFERENCE TO RELATED APPLICATIONS

This application is a continuation of U.S. Ser. No. 10/605,573, filed Oct. 9, 2003, now U.S. Pat. No. 7,383,305 issued Jun. 3, 2008, the disclosure of which is incorporated by reference herein in its entirety. U.S. Pat. No. 7,383,305 is assigned to the same assignee as this application, International Business Machines Corporation of Armonk, N.Y.

BACKGROUND OF INVENTION

The present invention relates generally to messaging systems, and, more particularly, to a method, system, and storage medium for providing search and reference functions for use with a messaging system.

Messaging systems such as electronic mail (e-mail) allow computer users to compose messages using a simple text editor and then send these messages to another user. Computer users are also able to send electronic files, graphical data such as spreadsheets and charts, and multi-media data as well. Most online services and Internet Service Providers (ISPs) offer some form of email or messaging capability. With the use of gateways and widely accepted communications standards such as MAPI and X.400, these users can readily exchange messages with users of other types of messaging systems.

When composing or responding to a message, oftentimes the user is required to relate back to a previous message or correlative stored data for a reference or for clarification purposes. This is most often the case in a business context whereby a user is following up on an issue previously initiated or when the user is directed to perform an action item. In this instance, the user is faced with having to search his or her email history folders, local directories, or other sources of electronic data in order to refresh the subject information and recollect the subject matter. Manually searching these data sources can be very time consuming and may not result in locating the desired data.

Current messaging systems allow a user to perform administrative functions within the personal email folder such as sorting messages alphabetically by sender, recipient or subject, as well as searching for specific emails by entering a word in the messaging system's search engine. In order to locate a specific message, the user must browse through all or a portion of the messages or perform keyword searches. Moreover, if the user desires to reference data other than a previous email message (e.g., text file, online document, etc.) for purposes of including the reference data into the email message, the user is required to exit out of the email window and initiate one or more searches of each source location (e.g., local hard drive, online search engine, network drive, etc.). Further, current messaging systems do not allow a user to view and select these search results from within the messaging system and incorporate the search results into the message being composed. In other words, with respect to messaging systems, a user who is composing or responding to a message currently does not have sufficient capability to search for relevant content and incorporate it into the message unless the user first accesses a separate application or search engine.

Accordingly, it would be desirable to be able to enable a user to access and link relevant data either over a network or from archived sources in the context of creating or responding to electronic messages.

SUMMARY OF INVENTION

The foregoing discussed drawbacks and deficiencies of the prior art are overcome or alleviated by a method for providing search and reference functions for use with a messaging system. In an exemplary embodiment, the method includes receiving a request to search a data archive for reference information relating to at least one keyword selected by a messaging system user while the messaging system user is actively engaged in composing a message or a response to a message. The keyword is selected from the body of text contained in the message. The method further includes searching the data archive and, if a reference is found, presenting the reference to the messaging system user within the message itself. The data archive includes information gathered from the messaging system user's message folder and at least one of a local data storage system and a shared online repository. Embodiments of the invention also include a system and a storage medium.

BRIEF DESCRIPTION OF DRAWINGS

Referring to the exemplary drawings wherein like elements are numbered alike in the several FIGURES.

DETAILED DESCRIPTION

Disclosed herein is a method, system, and storage medium for providing search and reference functions for use with a messaging system. The search and reference system of the invention sends a reference link and/or the reference information itself along with the email message. These references are relevant to the subject brought forward in the email message and are obtained by searching keywords selected by the message sender and/or the recipient. The references are prompted to the users when opening the message whereby the users open the reference document or view the reference text/data. Sources of references include online resources, the sender's local repositories, as well as the recipient's local repositories.

Figure 1:
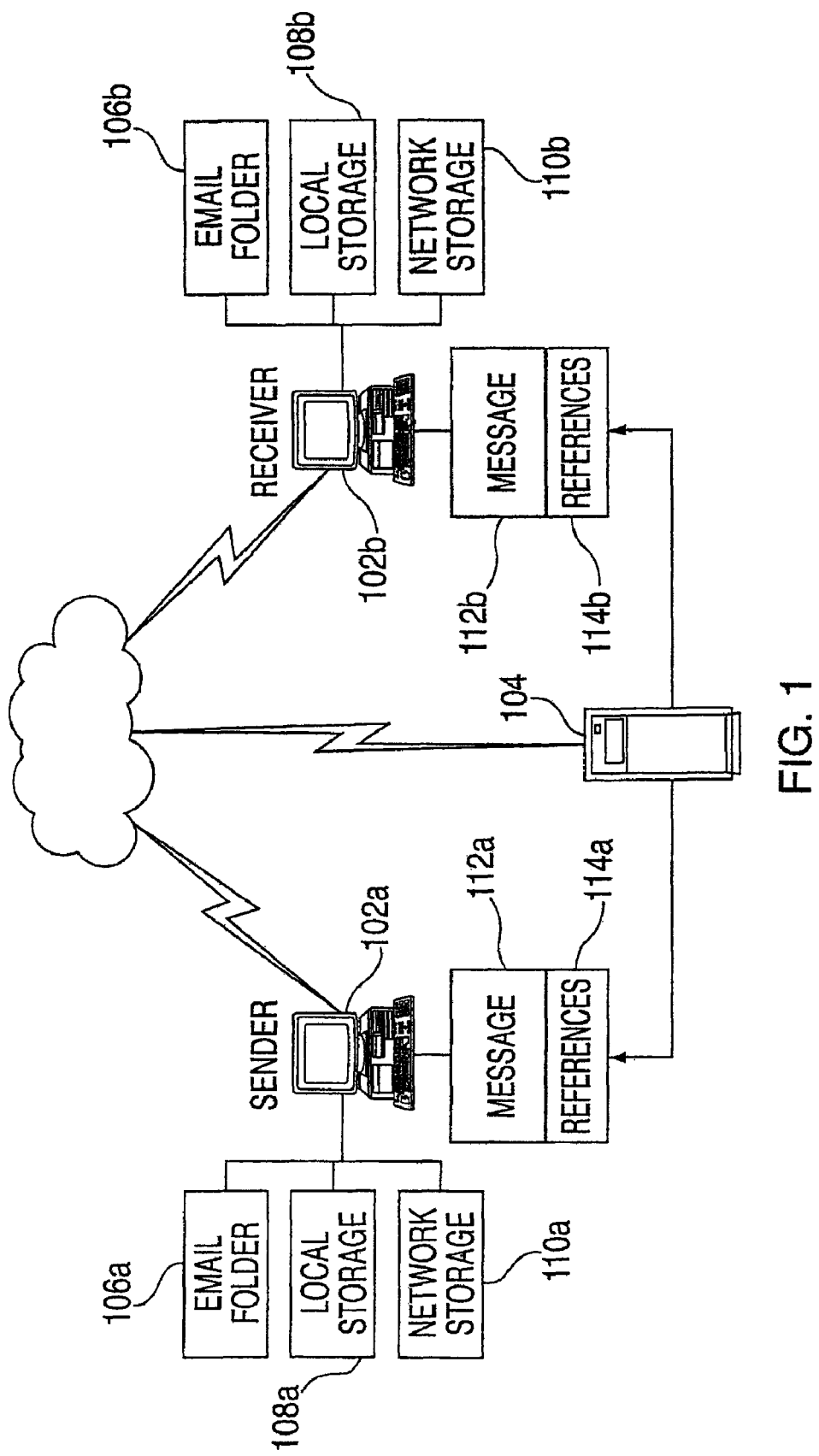
FIG. 1 is a block diagram of a system upon which the search and reference system is implemented in accordance with an exemplary embodiment of the invention.

Referring initially to FIG. 1, there is shown a block diagram of a network system for implementing the search and reference system. System 100 includes two client systems 102*a* and 102*b* in communication via a network connection.

Computer devices 102*a* and 102*b* may each comprise a general-purpose desktop computer including operating system software, a web browser component, Internet access, and a messaging program such as America Online™, Microsoft Outlook™, or other communications application. Computer devices 102*a* and 102*b* may store and execute the search and reference system of the invention, or may access the search and reference system over a network from a service provider. It will be understood by those skilled in the art that the search and reference system of the invention may be executed on computer systems with variant architectures. Client systems 102*a* and 102*b* may each comprise various data storage systems. These storage systems are in communication with computer devices 102*a* and 102*b*, and refer to any data repository that is both local to and logically addressable to computer devices 102*a* and 102*b*. Email storage 106*a* and 106*b* refer to electronic mail storage devices such as, for example, an email folder. Local storage 108*a* and 108*b* store data associated with client systems 102*a* and 102*b*, respectively, and may include such devices including a hard drive, floppy disk drive, and CD-ROM drive. Data stored in local storage 108*a* and 108*b* may include text files, graphical data, and archives of previously generated documents and electronic presentations. Network storage 110*a* and 110*b* refer to a data store relating to a local area network associated with client systems 102*a* and 102 such as an Intranet network, Extranet network, virtual private network, or other similar related storage systems.

Client systems 102*a* and 102*b* are in communication with a server 104 via network connection such as a T1 line or cable 108 which accesses the Internet or other suitable means of networking architecture.

Server 104 comprises a high-powered multiprocessor computer device including web server and applications server software for receiving requests from client systems 102*a* and 102*b* to access information via the Internet or other network. Server 104 stores an access control list for enabling users of different networks to share information online as will be described further herein. Additionally, server 104 may be a resource of information for client systems 102*a* and 102*b* aside from the search and reference system of the invention. For example, server 104 may be managed by a business organization that disseminates product information and services over its website and interacts with customers conducting electronic business over the server system. Although only one server is shown in FIG. 1, it will be understood by those skilled in the art that any number of servers or online data sources may be in communication with client systems 102*a* and 102*b* when implementing the search and reference system.

The search and reference system of the invention may be executed as a standalone application that is installed or downloaded on a client system 102*a*, 102*b* or may be incorporated into an existing commercial messaging program such as IBM Lotus Notes™, Microsoft Outlook™, and America Online™. Further, the features of the search and reference system may be provided via a third party application service provider (ASP) or e-utilities broker where service is provided for a per-use fee.

Figure 2:
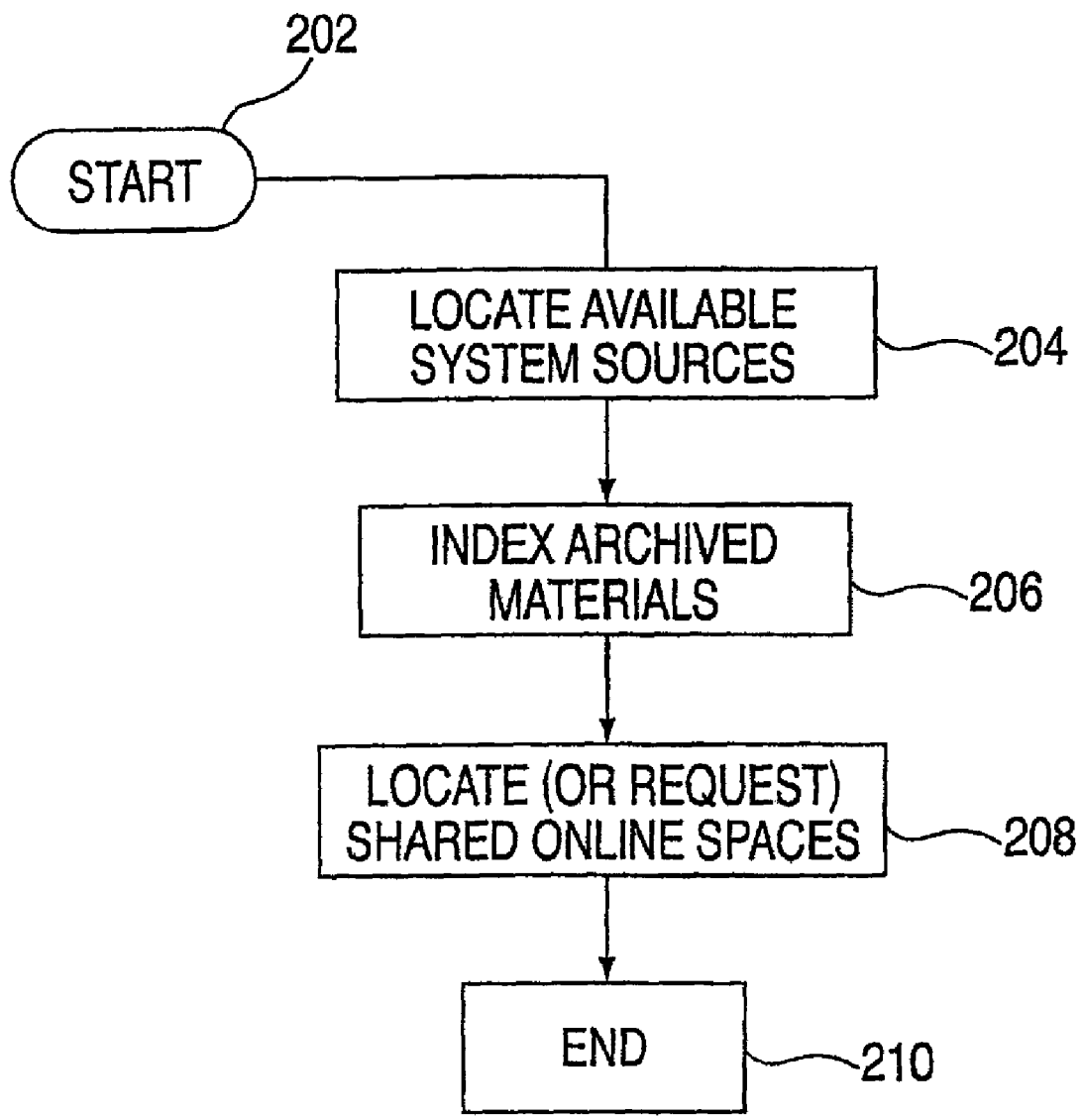
FIG. 2 is a flowchart describing a process of building an archive of reference materials for use in implementing the search and reference system in accordance with a further aspect of the invention.

The search and reference system of the invention allows senders and receivers of electronic messages to search and view relevant data, documents, files, etc., that relate to the message being composed, transmitted, and/or responded to. The data searched by the search and reference system is retrieved from one or more of storage systems 106*a*-*b*, 108*a*-*b*, 110*a*-*b*, and server 104. For each client system, the search and reference system builds a data archive of information obtained from these storage systems and makes the data available for the user of each client system when composing or responding to messages. System 100 illustrates the archived data in storage devices 106*a*-110*a* for client system 102*a*, and the archived data in storage devices 106*b*-110*b* for client system 102*b*, respectively. FIG. 2 illustrates the process of building a data archive.

The process begins at step 202 during initialization of the search and reference system. Any available system data sources are located at step 204. Data sources include Uniform Resource Locators (URLs), web addresses, hypertext links, message addresses, documents, reports, memos, and any other information typically found in data storage. This data reflects past activities conducted by the system user, information directly transmitted to the system user, and information made available and accessible to the system user. The search and reference system indexes and stores the information for later retrieval at step 206. Indexing may be performed using an indexing generator. Indexing generators are used to organize and classify data and are typically found in application and operating system software. The indexed information is stored to enable quick searches to be performed on keyword(s) as well as to enable analysis on how keywords relate to each other in a textual context.

At step 208, the search and reference system determines which, if any, online spaces will be shared with another user. The addressee, such as a message system user on client system 102*b*, gains access to files through manual choices or preferences defined by the sender. First, the sender is prompted with files to be shared with the addressee, optionally together with a notification of what files are already available to the addressee. If the sender selects such files (not available to the addressee) that he would like to share with the addressee, these files may be automatically stored online in a network place where all parties involved can reasonably access the files. Alternatively, addressees may gain access to these files on the client system of the sender, provided the addressee can access through the sender's network facilities. Yet another embodiment may refer to online sources where these files can be found, that can be publicly accessed, such as governmental publications. These references of online resources may be stored together with the file information, or may already be available when the user's browser history is searched for related files. The archived data is now ready for use by the search and reference system and the process ends at step 210.

Figure 3:
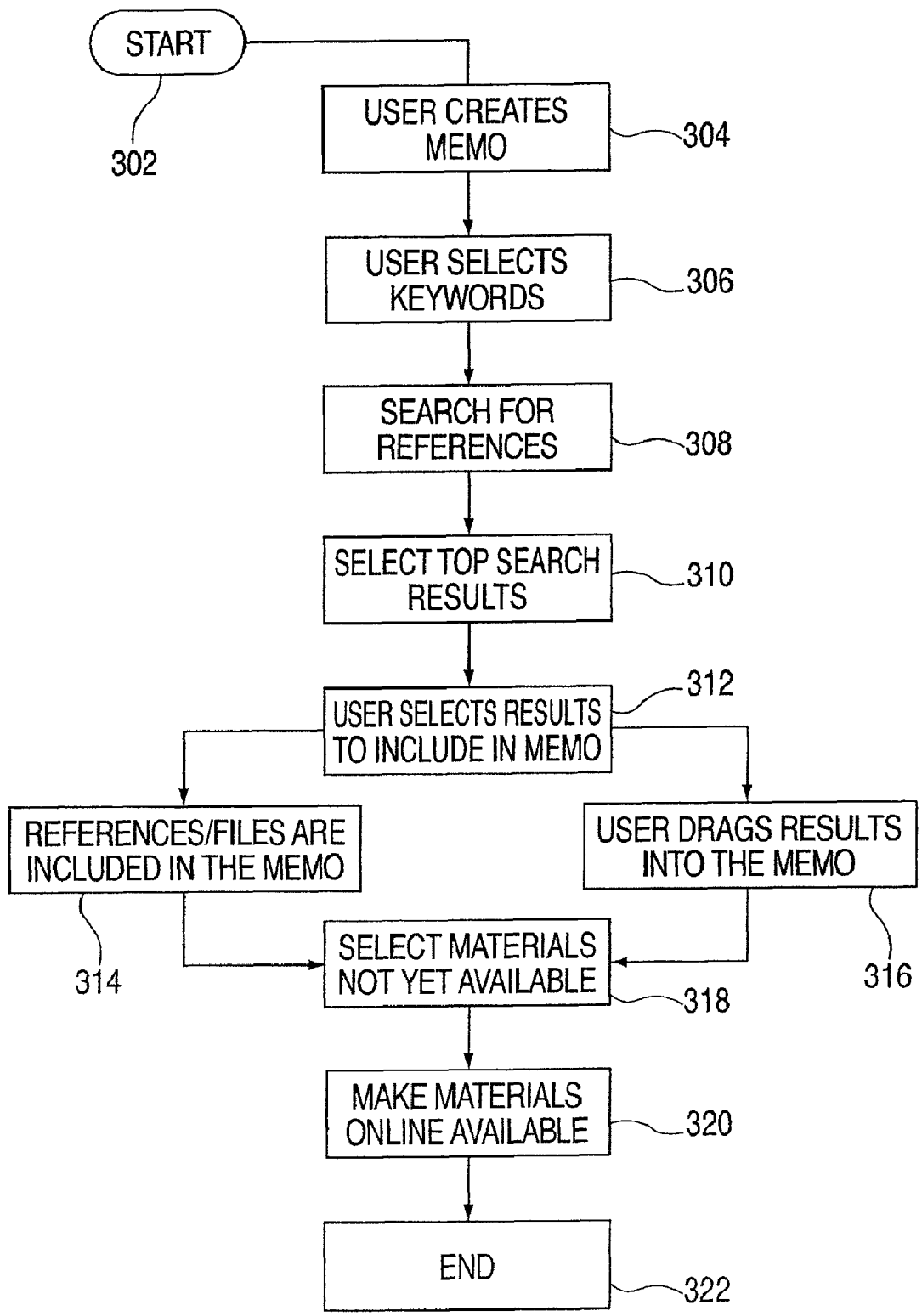
FIG. 3 is a flowchart describing a process of composing a message with references implementing the search and reference system in accordance with a further aspect of the invention.
Figure 5:
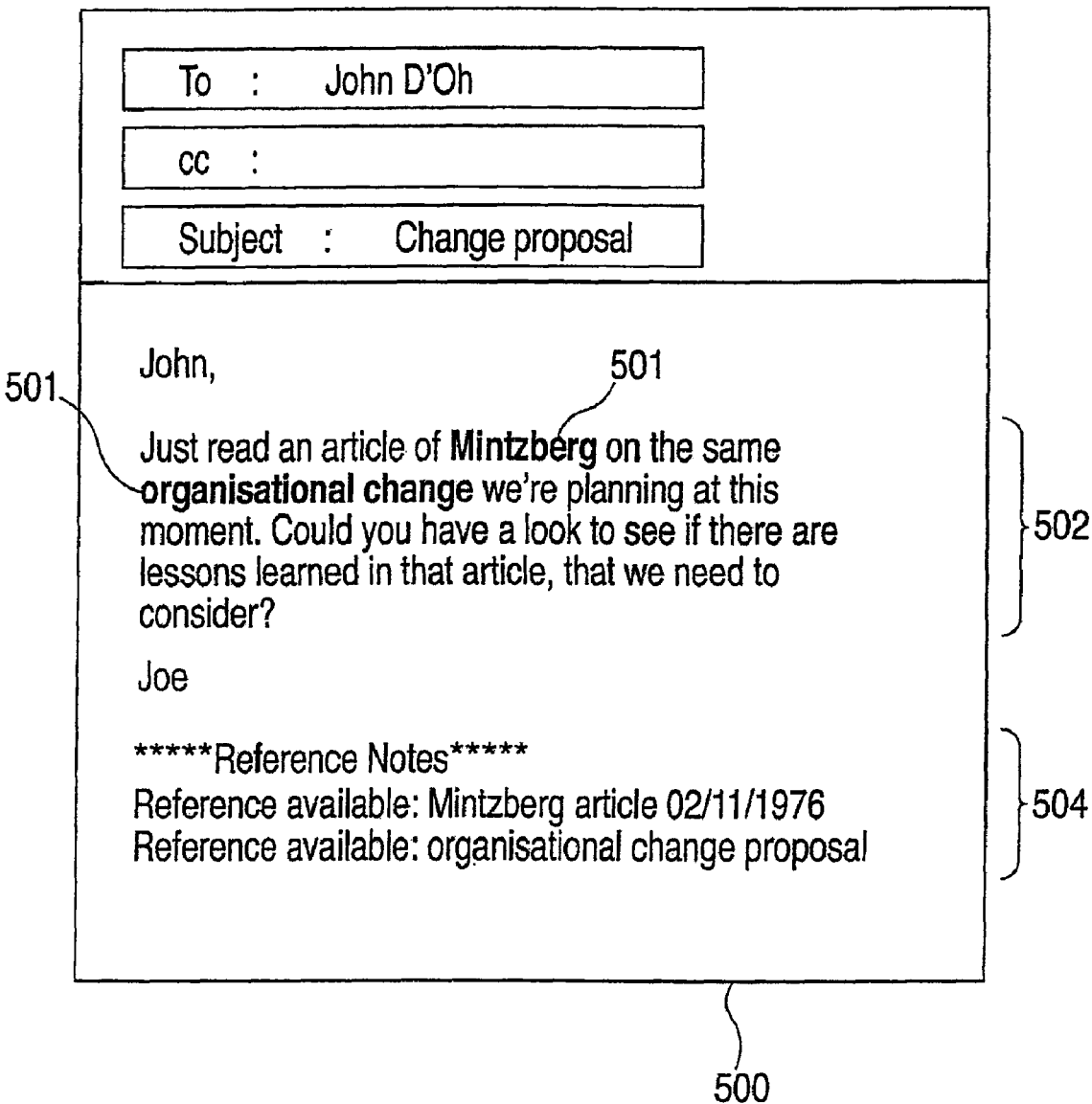
FIG. 5 illustrates a sample computer screen window displaying a message along with search results provided by the search and reference system, in accordance with a further aspect of the invention.

A user who is preparing to send a message implements the search and reference system of the invention as described in FIG. 3. The process begins at step 302 whereby a user (referred to herein as 'message sender') creates a message at step 304 via client system 102a. A sample message 500 is depicted in FIG. 5. The message sender selects keywords 501 from the body 502 of the message to be searched at step 306. This may be done by highlighting the text to be searched. At step 308, the search and reference system searches one or more of data sources 106a-110a and server 104 for information relating to the keyword(s) selected. The search results 504 for message 500 are displayed within the message window at step 310. The message sender selects one or more of the results to include in the message at step 312. The message sender has the option of incorporating the reference as a link to be opened by the recipient at step 314, or may select and paste portions or elements of the reference text itself into the current message at step 316.

At step 318, the search and reference system determines whether the materials selected by the message sender are already available to the recipient (e.g., client system 102b). This may be the case where the reference materials originated from the recipient in a previous communication to the message sender. The search and reference system performs this check by examining the addresses stored in the access control list for the shared online repository 104. If the online repository is publicly available, this check is not required. If the recipient of the message already has access to the reference materials as indicated by the access control list, the message will reflect the reference location where the material may be found. If there are multiple addresses on the message, some of which are without access to the shared online repository 104, the references may be made available by directing the addressees to an online server at step 320. For example, online repository 104 may be a teamroom as provided by IBM's Lotus Notes™. Selected members of an online community have authorized access to this space. Where all addressees on the message have access to that teamroom, sharing the online space occurs with no problem. However, if one of the addressees does not have access to the online space, the search and reference system may make the documents available in another online space, as provided in step 320, which can be accessed by all addressees. The process then ends at step 322.

Figure 4:
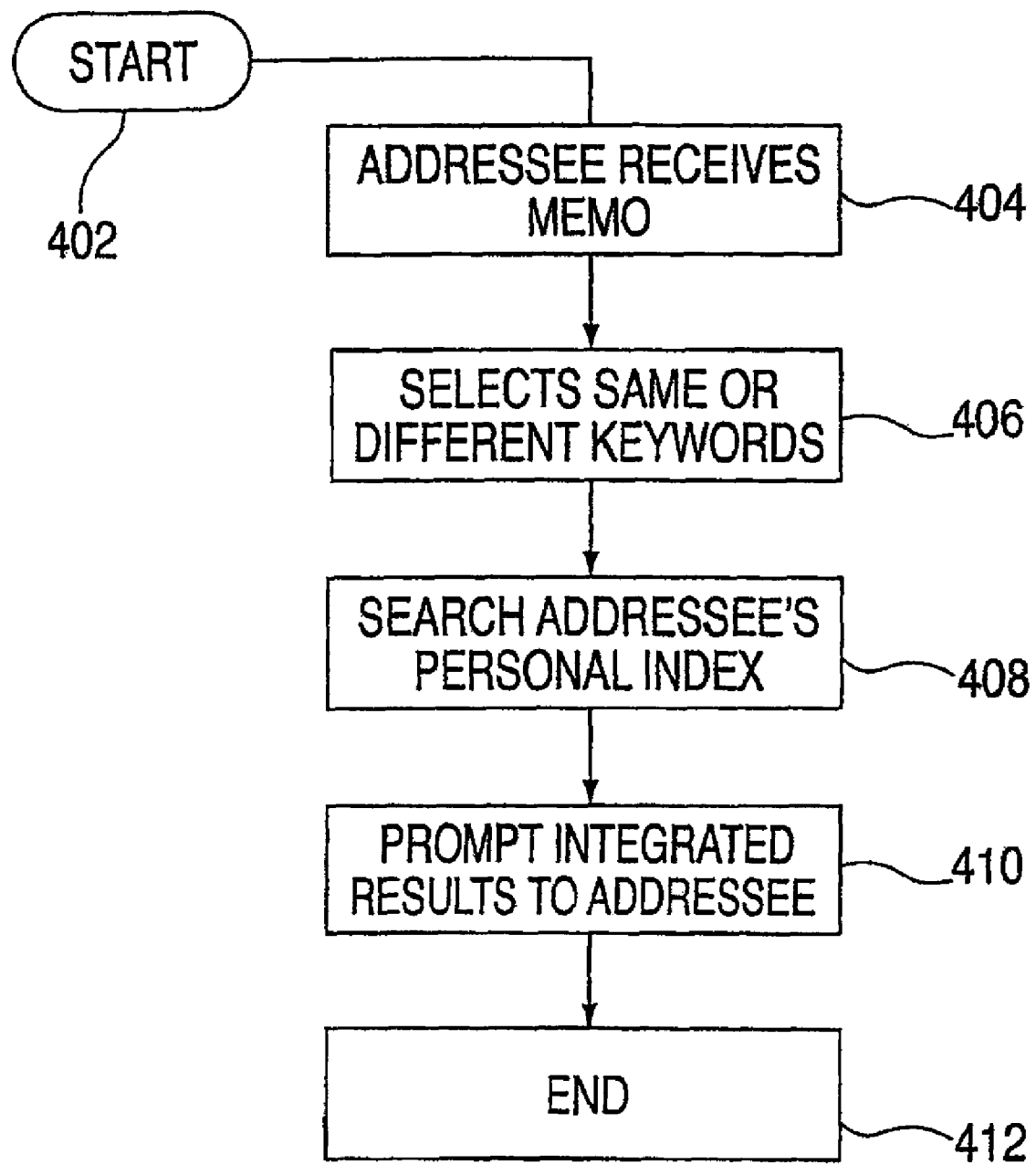
FIG. 4 is a flowchart describing a process of viewing and/or responding to a message created using the search and reference system in accordance with a further aspect of the invention.

Once the message is transmitted to the recipient, the recipient at client system 102b may access the message utilizing the search and reference system of the invention as described in FIG. 4. The process starts at step 402 whereby a message recipient receives a message with reference materials at step 404. The recipient reads the message text and may access the reference materials in order to obtain additional information. The recipient may also search his or her own repositories 106b-110b via the search and reference system by highlighting the same or alternative keywords in the message body at step 406. The search and reference system performs a search of data sources 106b-110b using these keywords at step 408. At step 410, the results may be integrated into the body of the message as described in steps 310-320 of FIG. 3. In this manner, the recipient may respond to the message sender with additional references or may forward the message to other addressees as desired. The process ends at step 412.

The search and reference system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of Message analysis Software. To implement the search and reference systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 6A and 6B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems are identified and compared to the list of operating systems, version numbers, and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 6A:
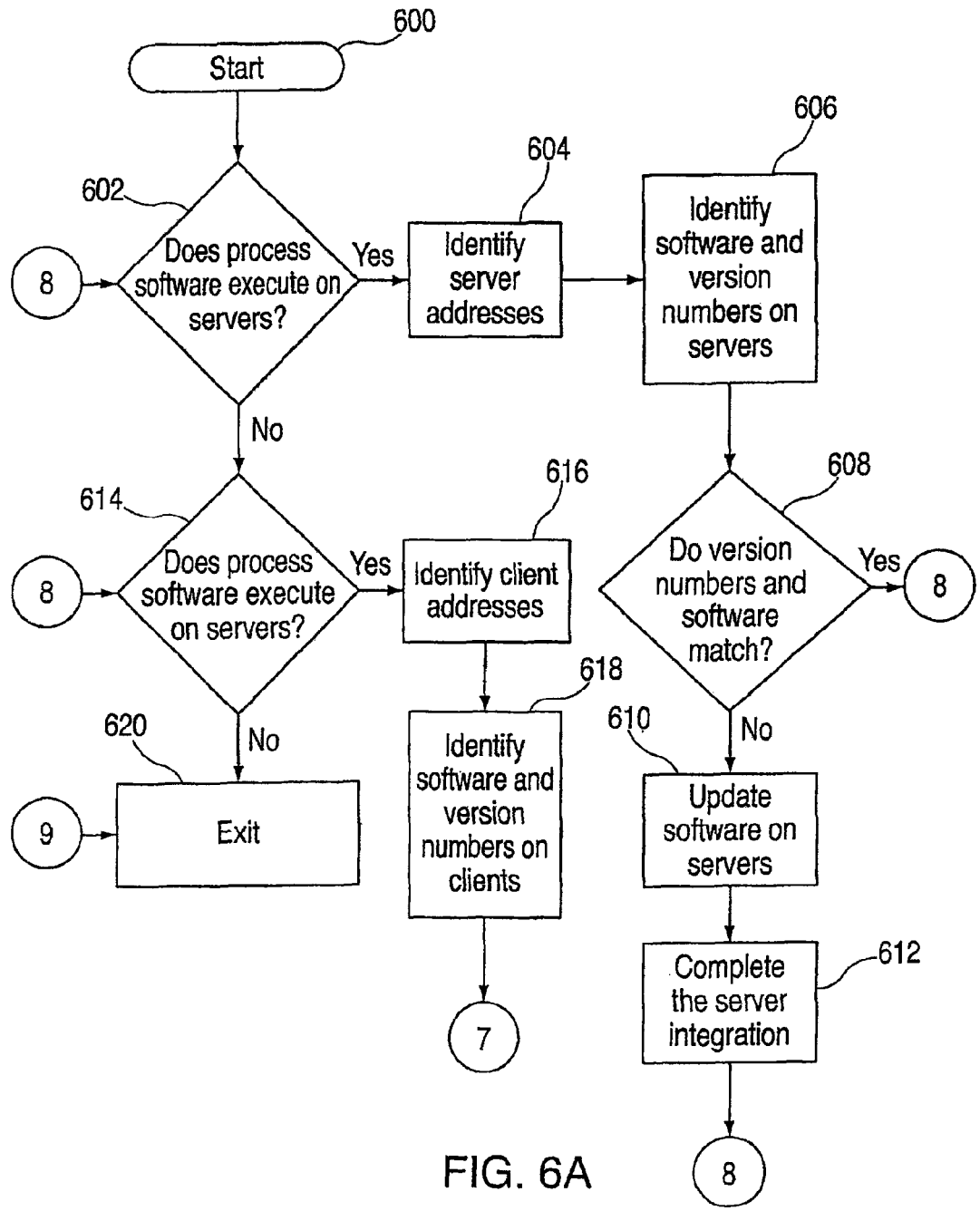
FIGS. 6A and 6B are flowcharts illustrating how the process software implementing the systems and methods of the invention may be integrated into client, server, and network environments.
Figure 6B:
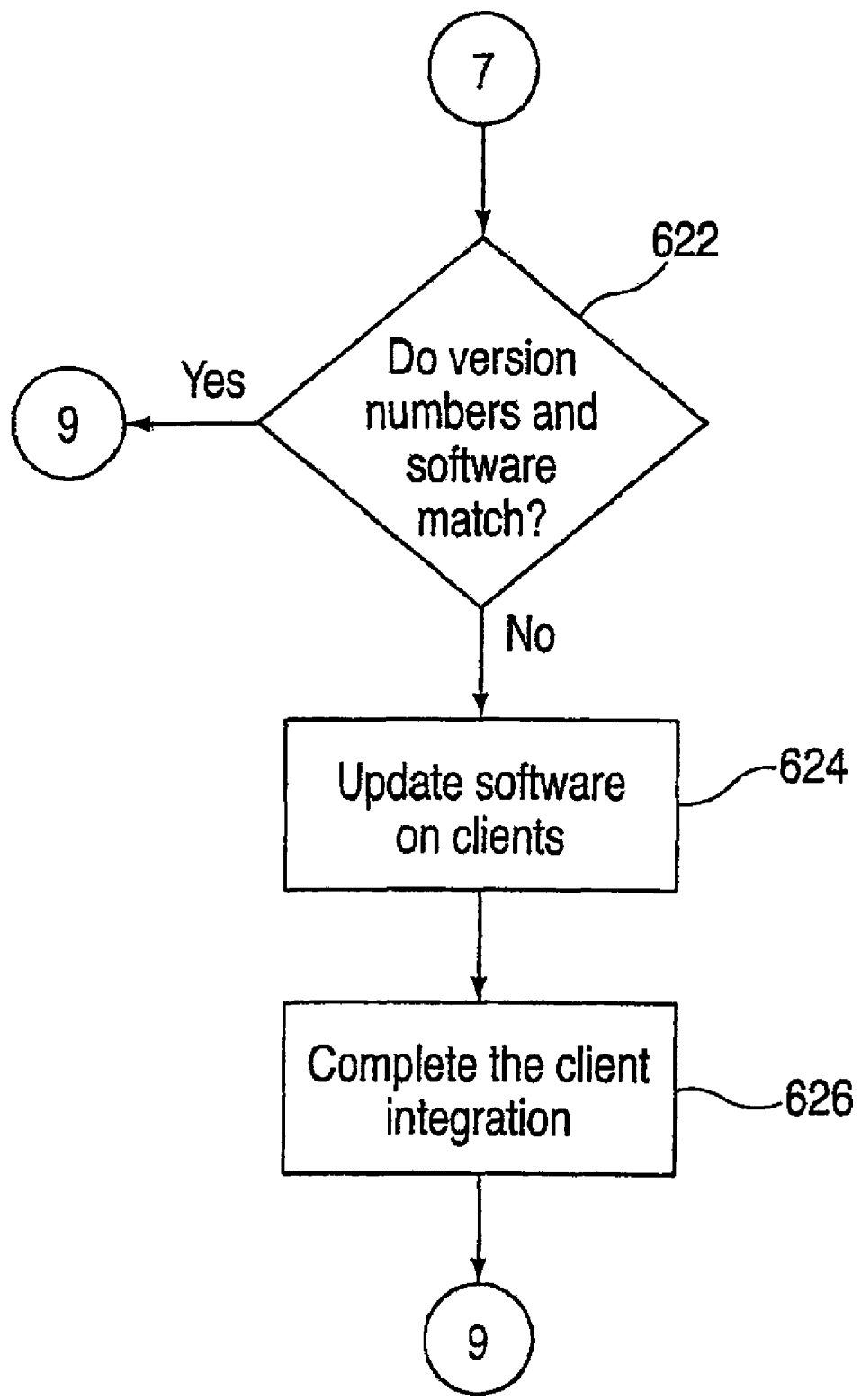

Referring to FIGS. 6A and 6B, step 600 begins the integration of the process software for implementing the search and reference systems and methods of the present invention. It is determined whether there are any process software programs that will execute on a server or servers at step 602. If this is not the case, then integration proceeds to determine if the process software will execute on clients at step 614. If there are process software programs that will execute on a server(s), then the server addresses are identified at step 604. The servers are checked to see if they contain software that includes the operating system (OS), applications, and network operating systems (NOS), together with their version numbers, that have been tested with the process software at step 606. The servers are also checked to determine if there is any missing software that is required by the process software as part of the activity at step 606. A determination is made whether the version numbers match the version numbers of OS, applications and NOS that have been tested with the process software at step 608. If all of the versions match, and there is no missing required software, the integration continues at step 614. If one or more of the version numbers do not match, then the unmatched versions are updated on the server or servers with the correct versions at step 610. Additionally, if there is missing required software, then it is updated on the server or servers at step 610. The server integration is completed by installing the process software at step 612.

Step 614, which follows either step 602, 608 or 612, determines if there are any programs of the process software that will execute on the clients. If no process software programs execute on the clients, the integration proceeds to step 620 and exits. If there are process software programs that will execute on clients, the client addresses are identified at step 616.

At step 618, the clients are checked to see if they contain software that includes the operating system (OS), applications, and network operating systems (NOS) software, together with their version numbers, that have been tested with the process software. The clients are also checked at step 618 to determine if there is any missing software that is required by the process software.

At step 622, a determination is made if the version numbers match the version numbers of OS, applications and NOS that have been tested with the process software. If all of the versions match, and there is no missing required software, then the integration proceeds to step 620 and exits.

If one or more of the version numbers do not match, then the unmatched versions are updated on the clients with the correct versions at step 624. In addition, if there is missing required software, then it is updated on the clients as part of step 624. The client integration is completed by installing the process software on the clients at step 626. The integration proceeds to step 620 and exits.

Deployment of Message analysis System Software. It should be well understood that the process software for implementing the search and reference system of the present invention may be deployed by manually loading the process software directly into the client, server, and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of the same with reference to FIGS. 7A and 7B, where the deployment processes are illustrated, will be more easily understood.

Step 700 begins the deployment of the process software. It is determined whether there are any programs that will reside on a server or servers when the process software is executed at step 702. If the answer is "yes", then the servers that will contain the executables are identified, as indicated in step 736 in FIG. 7B. The process software for the server or servers is transferred directly to the servers' storage via FTP or some other protocol or by copying though the use of a shared file system at step 738. The process software is then installed on the servers as indicated at step 740.

Figure 7A:
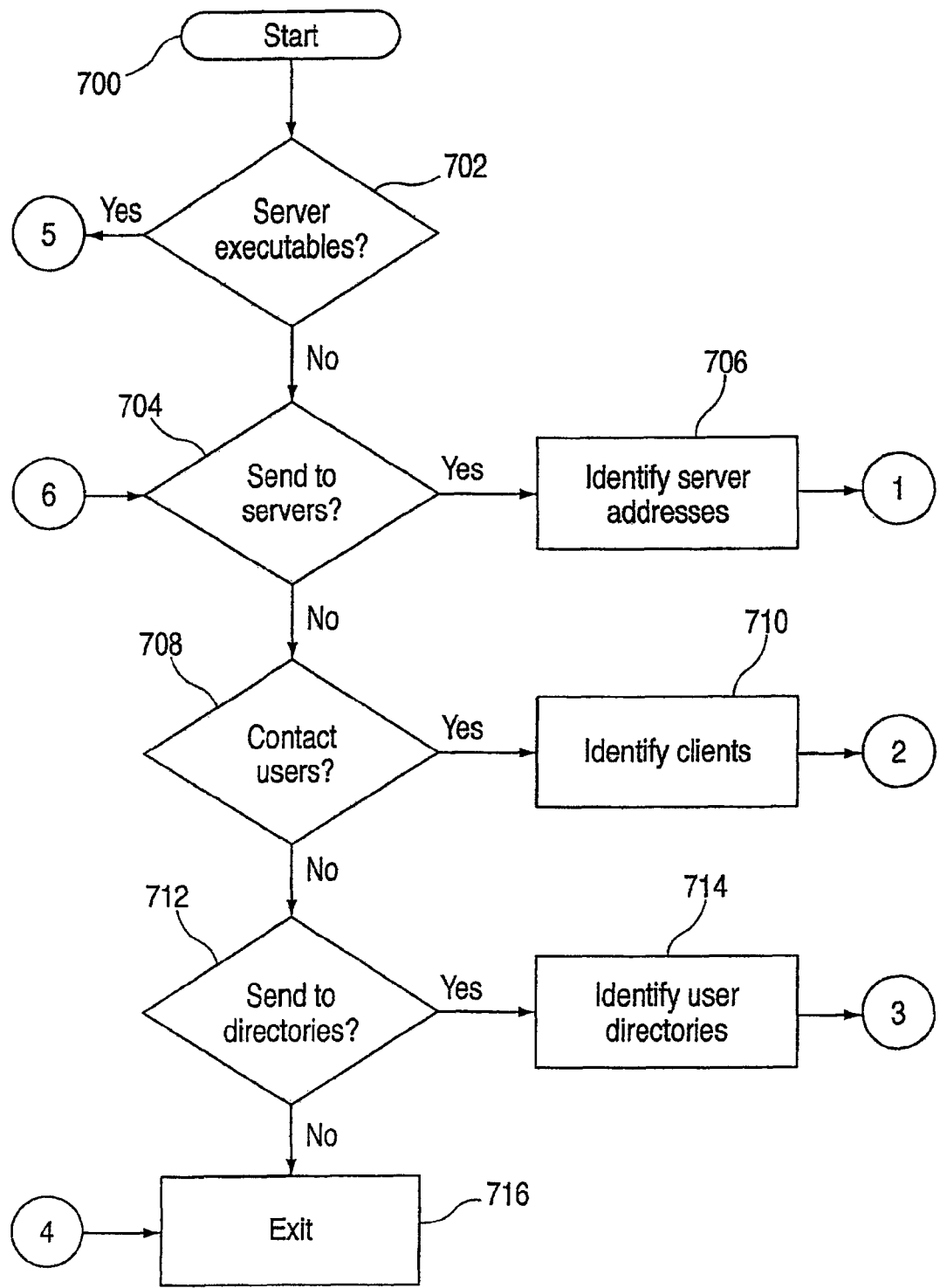
FIGS. 7A and 7B are flowcharts illustrating various ways in which the process software of the invention may be semi-automatically or automatically deployed across various networks and onto server, client (user), and proxy computers.
Figure 7B:
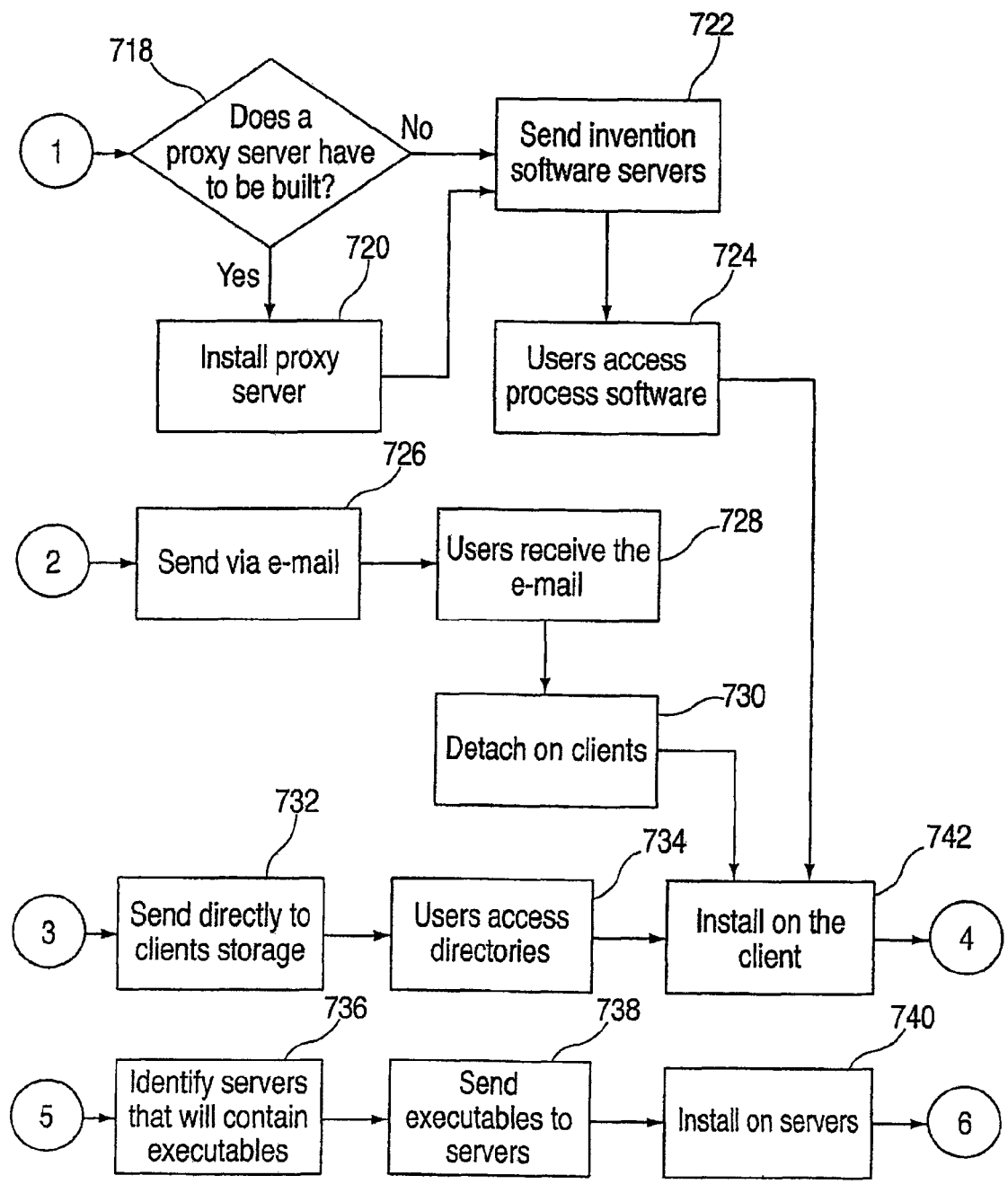

Next, as shown in step 704 in FIG. 7A, a determination is made on whether the process software is to be deployed by having users access the process software on a server or servers. If the users are to access the process software on servers, then the server addresses that will store the process software are identified at step 706.

Next, as shown at step 718, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 720. Next, the process software for implementing the present invention is sent to the servers, as indicated in step 722 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 724. Another alternative is to have the servers automatically copy the process software to each client and then run the installation program for the process software at each client computer. Either way, the user computer executes or causes to be executed the program that installs the process software on the client computer at step 742, then the process exits at step 716.

Continuing now at step 708 in FIG. 7A, a determination is made as to whether the process software is to be deployed by sending the process software to users via e-mail. If the answer is yes, then, as indicated at step 710, the set of users where the process software will be deployed are identified together with the addresses of the user client computers. The process software is sent via e-mail in step 726 (shown in FIG. 7B) to each of the users' client computers. Then, as indicated in step 728, the users receive the e-mail, and then detach the process software from the e-mail to a directory on their client computers at step 730. The user then executes the program that installs the process software on his client computer at step 742, and then exits the process at step 716.

Continuing at step 712 (see bottom of FIG. 7A), a determination is made on whether the process software will be sent directly to user directories on their client computers. If so, the user directories are identified at step 714. Then, the process software is transferred directly to the identified directory on the user's client computer, as indicated in step 732. This can be done in several ways such as, but not limited to, sharing of the file system directories and then copying them from the sender's file system to the recipient user's file system or, alternatively, using a transfer protocol such as File Transfer Protocol (FTP). Next, the users access the directories on their client file systems, as indicated in step 734, in preparation for installing the process software. Finally, the user executes the program that installs the process software on his client computer at step 742 and then exits the process at step 716.

Use of Virtual Private Networks for Message analysis System Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as a leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 8A-8C should be more readily understood.

Figure 8A:
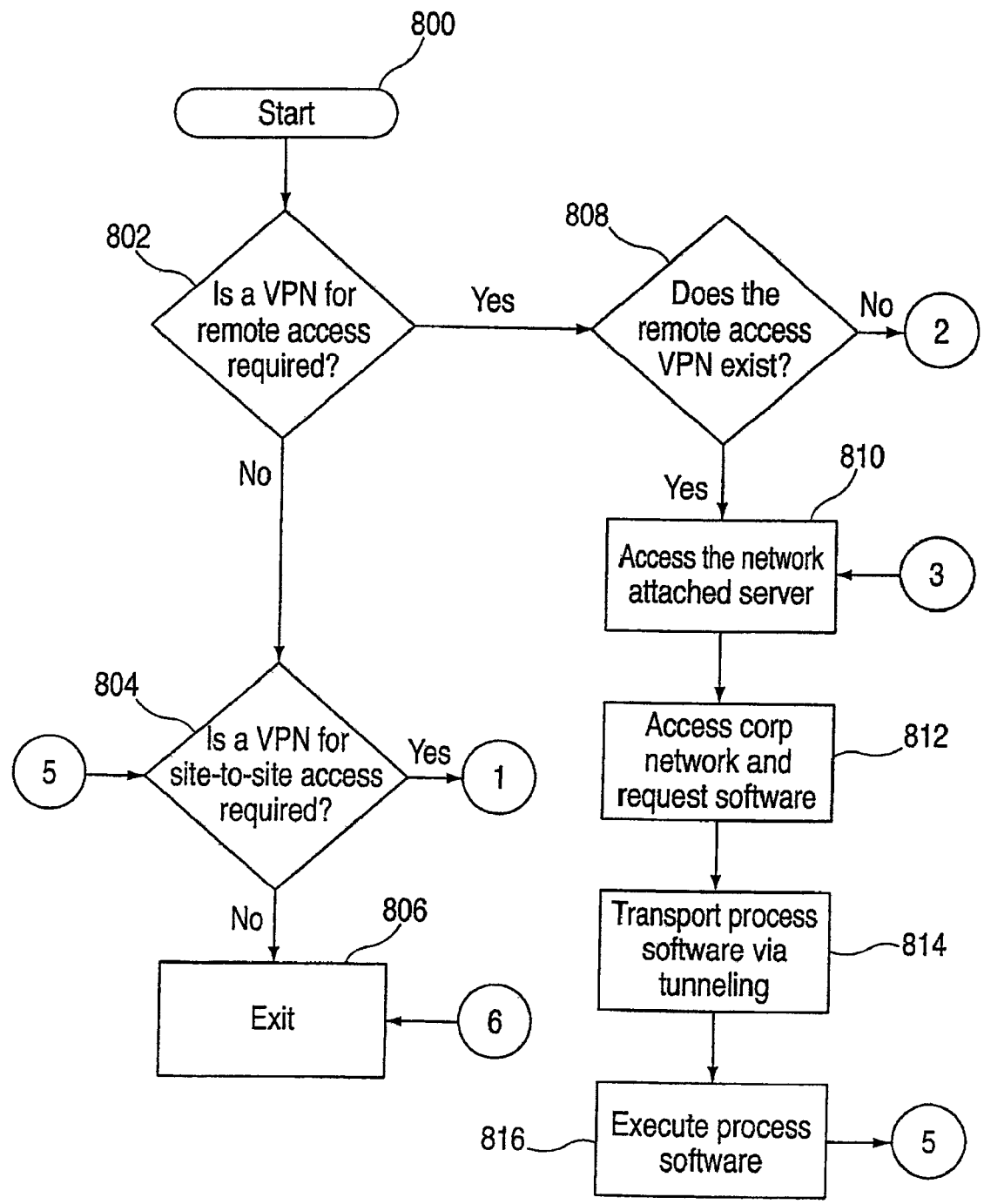
FIGS. 8A through 8C are flowcharts illustrating how process software for implementing the systems and methods of the invention are deployed through the installation and use of two different forms of a virtual private network (VPN)
Figure 8B:
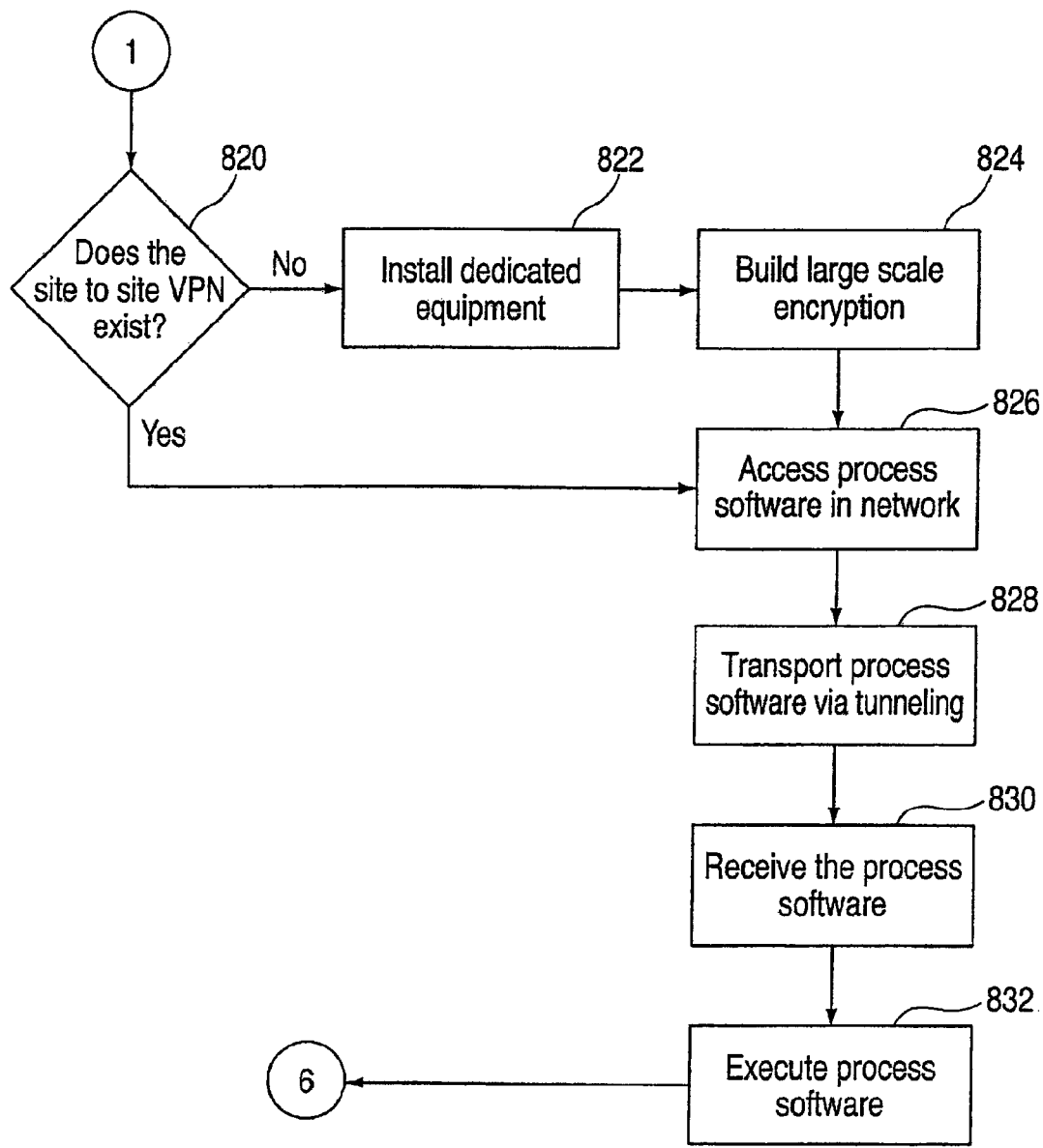
Figure 8C:
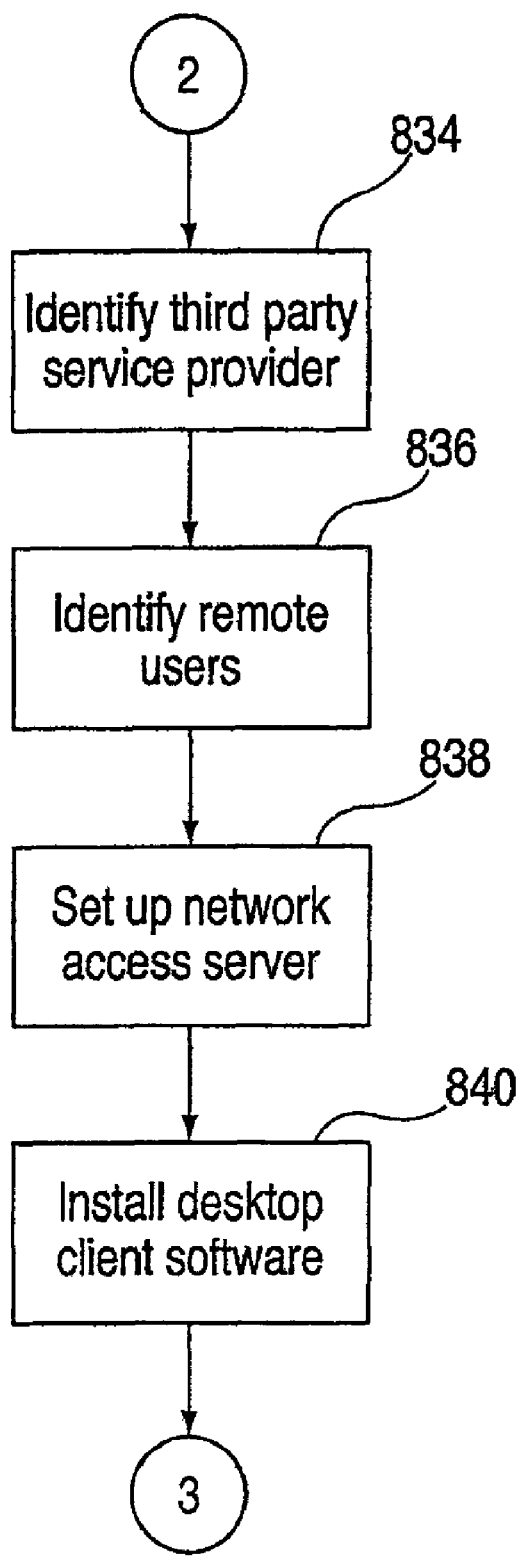

Step 800 in FIG. 8A begins the virtual private network (VPN) process. A determination is made at step 802 to see if a VPN for remote access is required. If it is not required, then flow proceeds to step 804. If it is required, then flow proceeds to step 808 where a determination is made as to whether a remote access VPN exists that is available for use.

If a remote access VPN does exist, then flow proceeds to step 810 in FIG. 8A. Otherwise flow proceeds to step 834 (see top of FIG. 8C), where a third party provider that will provide the secure, encrypted connections between the company's private network and the company's remote users is identified. Next, as indicated in step 836, the company's remote users are identified. Then, at step 838, the identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 840.

Returning to step 810 in FIG. 8A, after the remote access VPN has been built or if it been previously installed, the remote users can then access the process software by dialing into the NAS or attaching directly via a cable, DSL, or other modem into the NAS. This step 810 allows entry into the corporate network, as indicated at step 812, where the process software may be accessed. The process software is transported to the remote user's desktop computer over the network via tunneling. During tunneling, see step 814, the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 816.

Returning now to step 804 in FIG. 8A, a determination is made to see if a VPN for site-to-site access is required. If it is not required, then the process exits at step 806. If it is required, flow proceeds to step 820 (see top of FIG. 8B) to determine if the site-to-site VPN exists. If it does exist, then flow proceeds to step 826. If it does not exist, then as indicated at step 822, dedicated equipment required to establish a site-to-site VPN is installed. Then the large-scale encryption is built into the VPN at step 824.

After the site-to-site VPN has been built or if it had been previously established, the users access the process software via the VPN as indicated in step 826. Next, the process software is transported to the site users over the network via tunneling as indicated in step 828. As previously explained, the process software is divided into packets and each packet including the data and protocol is placed within another packet, as indicated in step 830. When the process software arrives at the remote user's desktop, it is removed from the packets, reconstituted, and is executed on the site users desktop at step 832. The process then proceeds to step 806 and exits.

Figure 9A:
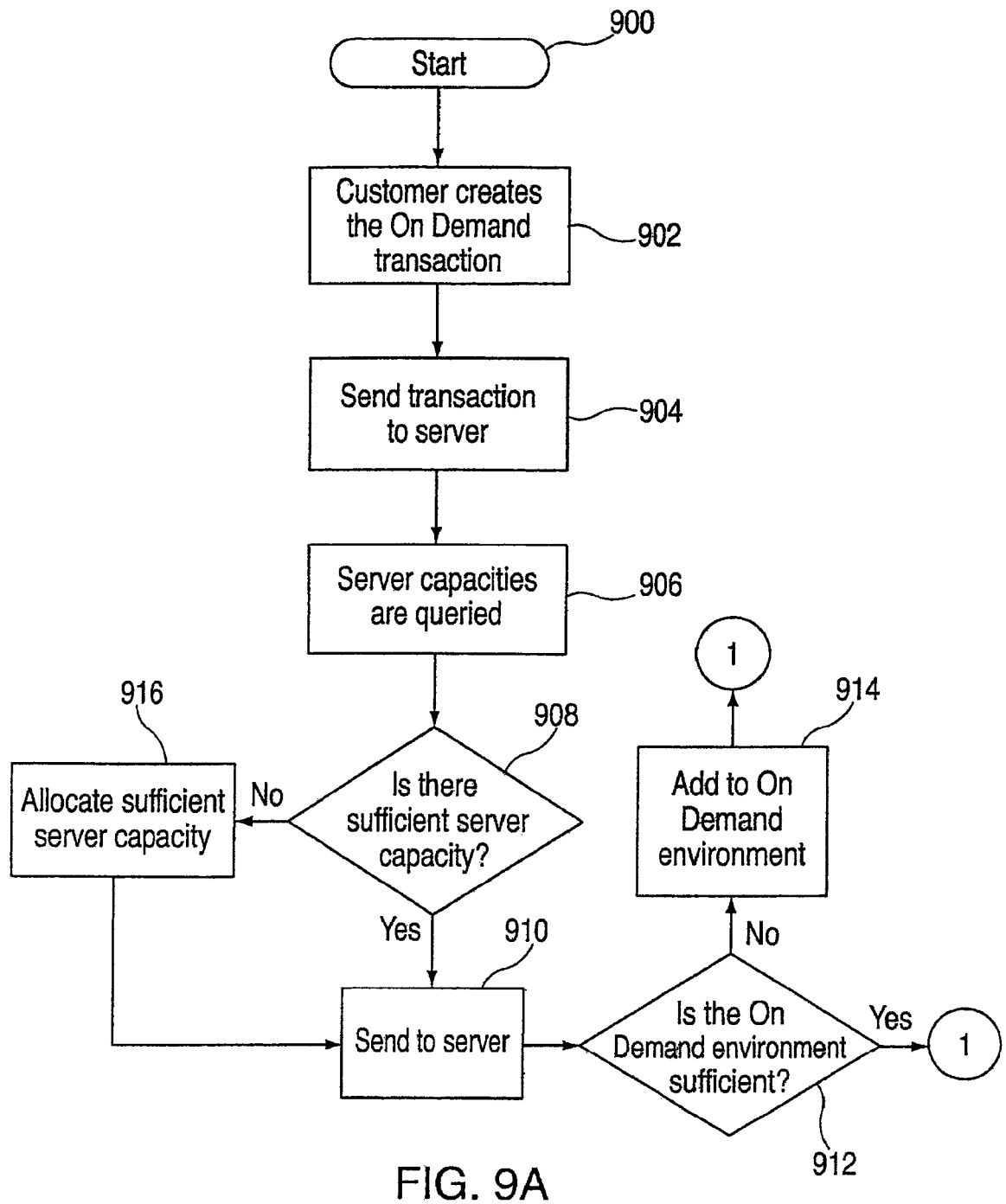
FIGS. 9A and 9B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 9B:
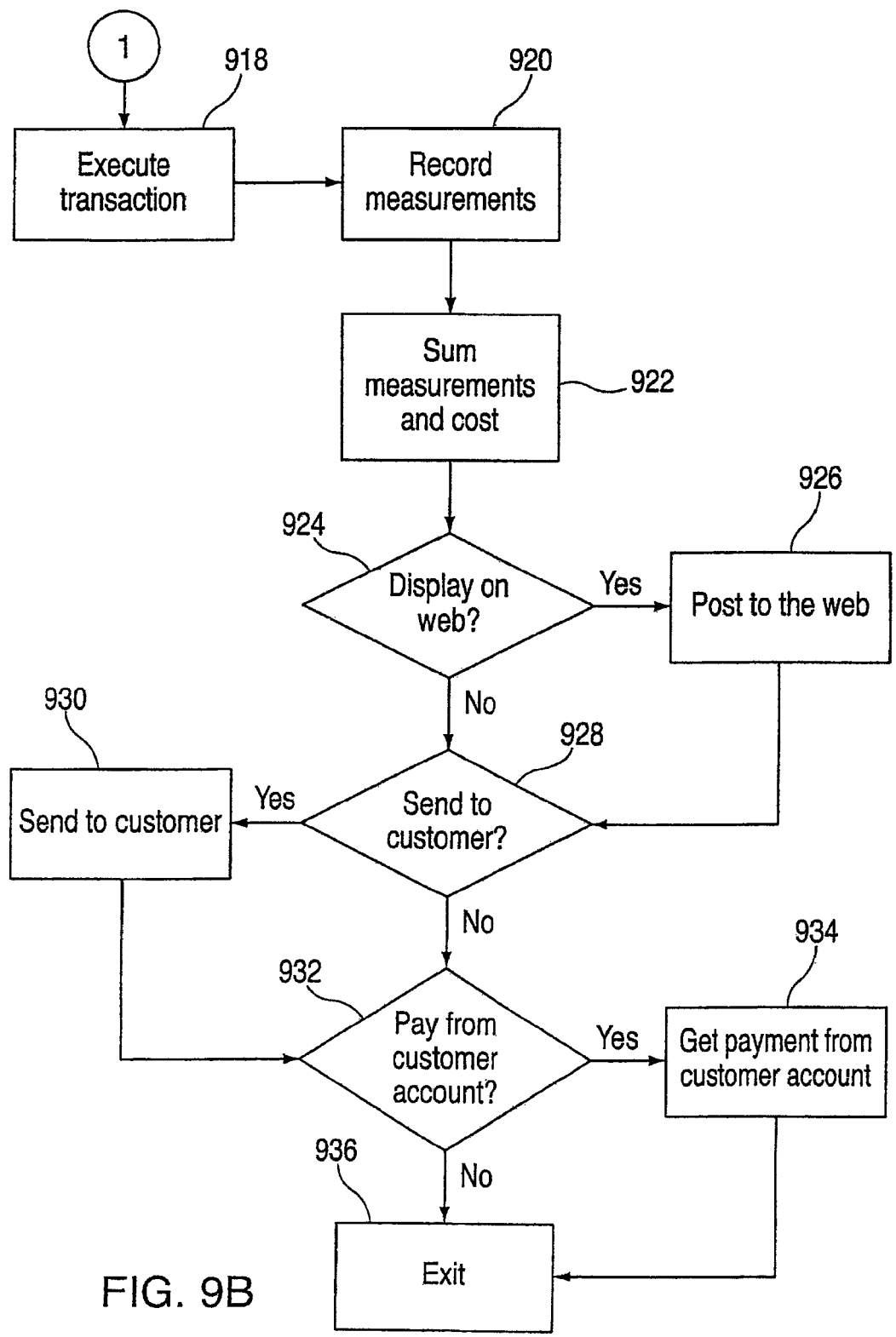

On Demand Computing for Message analysis System Software. The process software for implementing the search and reference system of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the search and reference system software will now be provided, followed by a more detailed description of same made with reference to the flowcharts of FIGS. 9A and 9B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, and the following detailed description of same with reference to FIGS. 9A and 9B where the on demand processes are illustrated, will be more easily understood.

Step 900 begins the On Demand process. A transaction is created that contains the unique customer identification, the requested service type and any service parameters that further specify the type of service as indicated in step 902. The transaction is then sent to the main server as shown in step 904. In an On Demand environment, the main server may initially be the only server. Then, as capacity is consumed, other servers are added to the On Demand environment.

The server central processing unit (CPU) capacities in the On Demand environment are queried at step 906. The CPU requirement of the transaction is estimated, then the servers' available CPU capacity in the On Demand environment are compared to the transaction CPU requirement to see if there is sufficient CPU available capacity in any server to process the transaction as indicated in step 908. If there is not sufficient server CPU available capacity, then additional server CPU capacity is allocated to process the transaction as indicated in step 916. If there was already sufficient available CPU capacity, the transaction is sent to a selected server at step 910.

Before executing the transaction, a check is made of the remaining On Demand environment to determine if the environment has sufficient available capacity for processing the transaction as indicated at step 912. This environment capacity consists of elements such as, but not limited to, network bandwidth, processor memory, storage, etc. If there is insufficient available capacity, then capacity will be added to the On Demand environment as indicated in step 914. Next the required software to process the transaction is accessed, loaded into memory, and the transaction is executed as indicated in step 918.

The usage measurements are recorded as indicated in step 920. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 922.

If the customer has requested that the On Demand costs be posted to a web site as indicated in step 924, then they are posted to a web site at step 926. If the customer has requested that the On Demand costs be sent via e-mail to a customer address as indicated in step 928, then they are sent to the customer via e-mail as indicated in step 930. If the customer has requested that the On Demand costs be paid directly from a customer account at step 932, then payment is received directly from the customer account at step 934. The On Demand process proceeds to step 936 and then exits.

As will be appreciated from the above description, the restrictions and limitations that exist with current messaging applications are efficiently overcome. The search and reference system of the invention enables a search to be performed for relevant information during the creation of, or response to, an electronic message. The available material in the message text provides the context for searching for related information. Relevant search results are provided to both the email sender and receiver within the message text. The message composer and/or recipient may then select from the relevant search results and enter it into the current message or use in preparing a message response.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A non-transitory storage medium encoded with machine-readable computer program code for providing search and reference functions for a messaging system, the non-transitory storage medium including instructions for causing a computer to implement a method, comprising:

receiving a request to search a data archive for reference information relating to at least one keyword selected by a messaging system user, said messaging system user actively engaged in composing a message or a response to a message, and wherein further, said at least one keyword is selected from a body of said message's text;

searching said data archive;

if a reference is found, presenting said reference to said messaging system user within said message;

wherein said data archive includes information gathered from said messaging system user's message folder and at least one of:

a local data storage system; and a shared online repository; and further comprising instructions for causing said computer to implement:

integrating process software for providing said search and reference functions for a messaging system, said integrating process software further comprising:

determining if said process software will execute on at least one server;

identifying an address of said at least one server;

checking said at least one server for operating systems, applications, and version numbers for validation with said process software, and identifying any missing software applications for said at least one server that are required for integration;

updating said at least one server with respect to any operating system and application that is not validated for said process software, and providing any of said missing software applications for said at least one server required for said integration;

identifying client addresses and checking client computers for operating systems, applications, and version numbers for validation with said process software, and identifying any software applications missing from said client computers that are required for integration;

updating said client computers with respect to any operating system and application that is not validated for said process software, and providing any missing software application for said client computers required for said integration; and installing said process software on said client computers and said at least one server.

2. The non-transitory storage medium of claim 1, further comprising instructions for causing said computer to implement:

in response to a request by said messaging system user, providing access to a recipient of said message to said shared online repository operable for allowing said recipient to:

search for a reference within said shared online repository; and access references provided in said message.

3. The non-transitory storage medium of claim 1, wherein said at least one keyword is selected by highlighting a portion of text contained in said body of said message's text.

4. The non-transitory storage medium of claim 1, wherein said reference is provided to said messaging system user in the form of at least one of:

a hypertext link;

a Uniform Resource Locator;

a web address;

a document;

a report; and a memo.

5. The non-transitory storage medium of claim 1, wherein contents of said reference is pasted into said message in response to prompting said messaging system user to select all or a portion of said reference.

6. The non-transitory storage medium of claim 1, wherein said data archive is generated by:

locating available information sources associated with said messaging system user;

indexing archived data obtained from said available information sources; and locating at least one shared online repository in response to a request by said messaging system user to share information.

7. The non-transitory storage medium of claim 1, further comprising instructions for causing said computer to implement:

deploying process software for providing said search and reference functions for a messaging system, said deploying process software further comprising:

installing said process software on at least one server;

identifying server addresses for users accessing said process software on said at least one server;

installing a proxy server if needed;

sending said process software to said at least one server and copying said process software to a file system of said at least one server;

sending the process software to at least a first client computer; and executing said process software on said first client computer.

8. The non-transitory storage medium of claim 7, wherein said installing said process software further comprises:

determining if programs will reside on said at least one server when said process software is executed;

identifying said at least one server that will execute said process software; and transferring said process software to storage for said at least one server.

9. The non-transitory storage medium of claim 7, wherein said sending said process software to said first client computer further includes having said at least one server automatically copy said process software to said first client computer, and running an installation program at said first client computer to install said process software on said first client computer.

10. The non-transitory storage medium of claim 7, wherein said sending said process software to said first client computer further comprises identifying a user and an address of said first client computer.

11. The non-transitory storage medium of claim 7, wherein said sending said process software to said first client computer includes sending said process software to at least one directory on said first client computer.

12. The non-transitory storage medium of claim 7, wherein said sending said process software to said first client computer includes sending said process software to said first client computer via e-mail.

13. The non-transitory storage medium of claim 1, further comprising instructions for causing said computer to implement:

on-demand sharing of process software for providing said search and reference functions for a messaging system, said on demand sharing further comprising:
creating a transaction containing unique customer identification, requested service type, and service parameters;
sending said transaction to at least one main server;
querying said at least one main server about processing capacity associated with said at least one main server to help ensure availability of adequate resources for processing of said transaction; and
allocating additional processing capacity when additional capacity appears needed to process said transaction, said additional processing capacity being selected from the group of additional capacities consisting of central processing unit capacity, processor memory capacity, network bandwidth capacity, and storage capacity.

14. The non-transitory storage medium of claim 13, further comprising instructions for causing said computer to implement:
recording a plurality of usage measurements selected from the group of usage measurements consisting of network bandwidth, processor memory, storage, and central processing unit cycles.

15. The non-transitory storage medium of claim 14, further comprising instructions for causing said computer to implement:
summing said usage measurements;
acquiring at least one multiplicative value associated with said usage measurements and with unit costs; and
recording any such acquired multiplicative value as an on demand charge to a requesting customer.

16. The non-transitory storage medium of claim 15, further comprising instructions for causing said computer to implement at least one of:
posting said on demand charge on a web site if requested by said requesting customer; and
sending said on demand charge via e-mail to said requesting customer's e-mail address.

17. The non-transitory storage medium of claim 15, further comprising instructions for causing said computer to implement:
charging said on demand charge to said requesting customer's account if an account exists and if said requesting customer has selected a charge account payment method.

18. The non-transitory storage medium of claim 1, further comprising instructions for causing said computer to implement:
deploying, accessing, and executing process software for providing search and reference functions for use with a messaging system, said deploying, accessing, and executing process software implemented through a virtual private network;
wherein said deploying, accessing, and executing process software further comprises:
determining if a virtual private network is required;
checking for remote access to said virtual private network when it is required;
if said remote access does not exist, identifying a third party provider to provide secure, encrypted connections between a private network and remote users;
identifying said remote users; and
setting up a network access server operable for downloading and installing client software on desktop computers for remote access of said virtual private network;
accessing said process software;
transporting said process software to at least one remote user's desktop computer; and
executing said process software on said at least one remote user's desktop computer.

19. The non-transitory storage medium of claim 18, further comprising instructions for causing said computer to implement:
determining if said virtual private network has a site-to-site configuration for providing site-to-site access, and if said virtual private network is not so available, installing equipment required to establish a site-to-site configuration for said virtual private network;
installing large scale encryption into said site-to-site virtual private network; and
accessing said process software through said site-to-site configuration with large scale encryption.

20. The non-transitory storage medium of claim 19, wherein said accessing said process software further comprises at least one of:
dialing into said network access server, and
attaching directly via a modem into said network access server, said modem being selected from the group of modems consisting of telephone dial-up modems, cable modems, DSL modems, and wireless modems.

21. A system for providing search and reference functions for a messaging system, comprising:
a client system executing a messaging program, said client system including a web browser, local data storage system, and access to an Internet network;
a search and reference application executing on said client system;
a message with text entered by a client system user via said client system;
a link to a shared online repository external to said client system;
wherein said search and reference application performs:
searching a data archive for reference information relating to at least one keyword selected by said client system user, said client system user actively engaged in composing said message or a response to said message, and wherein further, said at least one keyword is selected from a body of text contained in said message;
if a reference is found, presenting said reference to said client system user within said message;
wherein said data archive includes information gathered from at least one of:
said client system user's local data storage system; and
a said shared online repository; and
integrating process software for providing said search and reference functions for a messaging system, said integrating comprising:
determining if said process software will execute on at least one server;
identifying an address of said at least one server;
checking said at least one server for operating systems, applications, and version numbers for validation with said process software, and identifying any missing software applications for said at least one server that are required for integration;
updating said at least one server with respect to any operating system and application that is not validated for said process software, and providing any of said missing software applications for said at least one server required for said integration;
identifying client addresses and checking client computers for operating systems, applications, and version numbers for validation with said process software, and identifying any software applications missing from said client computers that are required for integration;

updating said client computers with respect to any operating system and application that is not validated for said process software, and providing any missing software application for said client computers required for said integration; and installing said process software on said client computers and said at least one server.

22. The system of claim 21, wherein said shared online repository includes an access control list operable for granting and denying access to users of different network systems, said access allowing authorized users of said different network systems to perform at least one of:

searching for a reference contained in said shared online repository based upon at least one new keyword selected by said authorized users; and access references transmitted in said message;

wherein further said authorized users refer to recipients of said message for which said shared online repository is desired.

23. The system of claim 21, wherein said local data storage includes a message folder and at least one of:

a hard drive;
a floppy disk drive;
a CD-ROM or CD-RW drive; and
a network drive.

24. The system of claim 23, wherein data gathered from said local data storage includes at least one of:

text files;
spreadsheets;
graphical data; and
electronic presentations.

25. The system of claim 23, wherein said network drive includes at least one of:

a local area network;
an Extranet network; and
a virtual private network.

26. The system of claim 21, wherein said reference is provided to said messaging system user in the form of at least one of:

a hypertext link;
a web address;
a Uniform Resource Locator;
a report;
a memo;
a message address; and
a document.

* * * * *